(12) United States Patent
Wagemann

(10) Patent No.: US 12,728,939 B2
(45) Date of Patent: Sep. 8, 2026

(54) CRAWLER DRIVE FOR AN AGRICULTURAL WORK MACHINE AND AGRICULTURAL WORK MACHINE

(71) Applicant: CLAAS Industrietechnik GmbH, Paderborn (DE)

(72) Inventor: Sebastian Wagemann, Oelde-Sünninghausen (DE)

(73) Assignee: CLAAS Industrietechnik GmbH, Paderborn (DE)

( * ) Notice: Subject to any disclaimer, the term of this patent is extended or adjusted under 35 U.S.C. 154(b) by 295 days.

(21) Appl. No.: 18/645,602

(22) Filed: Apr. 25, 2024

(65) Prior Publication Data

US 2024/0359755 A1 Oct. 31, 2024

(30) Foreign Application Priority Data

Apr. 25, 2023 (DE) ........................ 102023110457.8

(51) Int. Cl.
*B62D 55/112* (2006.01)
*A01D 69/00* (2006.01)
(Continued)

(52) U.S. Cl.
CPC ............ *B62D 55/112* (2013.01); *B62D 55/10* (2013.01); *B62D 55/12* (2013.01); *A01D 69/00* (2013.01)

(58) Field of Classification Search
CPC ...... B62D 55/112; B62D 55/10; B62D 55/12; A01D 69/00
See application file for complete search history.

(56) References Cited

U.S. PATENT DOCUMENTS 5,316,381 A * 5/1994 Isaacson .............. B62D 55/305 305/145
7,156,185 B2 * 1/2007 Juncker ..................... E02F 9/02 180/9.26
(Continued)

FOREIGN PATENT DOCUMENTS

CN 107804382 B * 4/2024 ........... B62D 55/065
DE 102014003964 A1 9/2015
(Continued)

OTHER PUBLICATIONS

Search Report for International Application No. 24157363.3-1009 mailed Aug. 19, 2024.

*Primary Examiner* — Faye M Fleming
(74) *Attorney, Agent, or Firm* — Lempia Summerfield Katz LLC

(57) ABSTRACT

A crawler drive for an agricultural work machine is disclosed. The crawler device includes front and rear main wheels, front and rear main frames associated with the front and rear main wheels respectively, two support wheels, a running belt surrounding the main wheels and an articulation point to pivotably connect to a body of the agricultural work machine while forming a machine axis. The two main frames, coupled to one another, pivot about a common pivot axis. The support wheels are positioned on a common support frame, which is pivotably connected to the front main frame. A coupling member is coupled at a swing arm end of the coupling member to the support wheel swing arm and at a frame end of the coupling member to the rear main frame and thereby couples the support wheel swing arm and the rear main frame to one another.

20 Claims, 6 Drawing Sheets

(51) Int. Cl.
*B62D 55/10* (2006.01)
*B62D 55/12* (2006.01)

(56) References Cited

U.S. PATENT DOCUMENTS

| | | | |
|---|---|---|---|
| 9,919,737 B2 | 3/2018 | Claas et al. | |
| 9,937,969 B2 * | 4/2018 | Obermeier-Hartmann .................. | B62D 55/1125 |
| 11,046,375 B2 * | 6/2021 | Obermeier-Hartmann .................. | B62D 55/1125 |
| 11,077,897 B2 * | 8/2021 | Tratta ................... | B62D 55/084 |
| 12,428,080 B2 * | 9/2025 | Wagemann ............ | B62D 11/02 |
| 2005/0121207 A1 * | 6/2005 | Juncker ..................... | E02F 9/02 172/780 |
| 2015/0266524 A1 | 9/2015 | Rackow et al. | |
| 2019/0135356 A1 | 5/2019 | Obermeier-Hartmann | |
| 2020/0269938 A1 | 8/2020 | Silies | |

FOREIGN PATENT DOCUMENTS

| | | | | |
|---|---|---|---|---|
| EP | 3483048 A1 | | 5/2019 | |
| EP | 3704928 A1 | | 9/2020 | |
| GB | 2301569 A | * | 12/1996 | ........... B62D 55/116 |
| JP | H10119837 A | * | 5/1998 | |
| JP | 2000092914 A | * | 4/2000 | |
| JP | 5844073 B2 | * | 1/2016 | |

* cited by examiner 16
6
38
12, 13, 14
39
22, 29
15
18
19
20, 27
17
25
30
26
5

1
4
6
25
20, 41
18
28
40
10
12, 13, 14
9
5
3

CRAWLER DRIVE FOR AN AGRICULTURAL WORK MACHINE AND AGRICULTURAL WORK MACHINE

CROSS REFERENCE TO RELATED APPLICATION

This application claims priority under 35 U.S.C. § 119 to German Patent Application No. DE 10 2023 110 457.8 filed Apr. 25, 2023, the entire disclosure of which is hereby incorporated by reference herein.

TECHNICAL FIELD

The present application relates to a crawler drive for an agricultural work machine and to an agricultural work machine.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

A crawler drive may comprise a front main wheel and a rear main wheel. These front and rear main wheels may also be referred to as so-called "idler wheels". Typically, one of the main wheels, such as the rear one, may be driven in rotation, while the other main wheel may passively serve to guide a running belt that surrounds the main wheels. The latter may also be part of the crawler drive. The main wheels may be arranged or positioned opposite each other or one behind the other in the longitudinal direction of the crawler drive. In this context, the front main wheel may be assigned to a front main frame, and the rear main wheel may be assigned to a rear main frame. In particular, this assignment may consist of the main wheels being arranged or positioned directly or indirectly on their respective main frame, and each are rotatably mounted about an axis of rotation.

In particular, the front main wheel may be mounted on a swivel arm which is arranged or positioned on the front main frame while forming its axis of rotation. The swivel arm is connected to the main frame and forms a swivel joint so that the swivel arm may swivel relative to the main frame. Since the axis of rotation of the main wheel is arranged or positioned at a distance from the swivel joint of the swivel arm on the latter, a swiveling of the swivel arm relative to the front main frame is accompanied by a movement of the swivel axle of the front main wheel on a circular path around the swivel joint. This movement leads to a change in the distance between the axis of rotation of the front main wheel and the axis of rotation of the rear main wheel, whereby a belt tension of the running belt is changed. In such a constellation or configuration, the swivel arm may also interact with a piston-cylinder unit, through which a swivel movement of the swivel arm may be generated, and the belt tension of the running belt may accordingly be adjusted. Such a piston-cylinder unit is referred to in the art as a "belt tensioning cylinder". Such an indirect arrangement of the axis of rotation of the front main wheel on the front main frame is understood within the meaning of the present application as an arrangement of the front main wheel on the front main frame.

At least two support wheels are arranged or positioned in an intermediate arca located between the two main wheels. These are also referred to as so-called "midrollers". The support wheels typically have a smaller diameter than the main wheels. Like the main wheels, they are in direct contact with the running belt, wherein the support wheels are in contact with a lower section of the running belt which typically comes into direct contact with ground when the crawler drive is in operation. In this way, forces acting on the crawler drive may be dissipated into the ground via the two main wheels as well as via the two support wheels the running belt.

The crawler drive also comprises an articulation point through which it may be pivotably connected to a body of a respective work machine, while forming a machine axis (or machine axle). In a typical agricultural work machine, such as a combine harvester or a forage harvester, a crawler drive is arranged or positioned at opposite ends of a front axle of the respective work machine. The respective crawler drive is articulated to the front axle of the agricultural work machine at the aforementioned linkage point so that the agricultural work machine stands on a respective ground via the crawler drives, and an advancement of the agricultural work machine may be realized by the crawler drives.

The two main frames to which the main wheels are assigned are pivotably coupled together. This has the effect that the main frames may be pivoted against each other about a common pivot axis (or pivot axle). This pivot axis may be identical to the machine axis at the articulation point of the crawler drive. The pivot axis and the machine axis are each oriented horizontally and perpendicular to a running belt plane spanned by the running belt.

The support wheels are arranged or positioned on a common support frame, wherein they are arranged or positioned one behind the other in relation to a longitudinal axis of the crawler drive. Consequently, the main wheels and the support wheels are arranged or positioned "in line" when viewed in the longitudinal direction of the crawler drive, wherein the front main wheel forms a front end of the crawler drive, followed by the two support wheels and finally the rear main wheel forming the rear end of the crawler drive.

To connect the support frame to the main frame, a support wheel swing arm is provided by which the support frame is pivotably connected to the front main frame. The support wheel swing arm is articulated both to the front main frame and to the support frame. In mechanical terms, the support wheel swing arm is therefore designed as a pendulum rod. The articulated connection of the two main frames and the articulated connection of the support wheel swing arm to the front main frame help the main wheels and the support wheels to be separately liftable from each other when driving over an obstacle without the rest of the crawler drive unit lifting off the ground.

US Patent Application Publication No. 2015/0266524 A1, incorporated by reference herein in its entirety, discloses a crawler drive in which the axle referred to above acts as the pivot axis, about which the front main frame and the rear main frame are pivotably mounted relative to one another, and the machine axis, which is located at the articulation point of the crawler drive to the axle of a respective agricultural work machine, coincide. See also U.S. Pat. No. 9,919,737, incorporated by reference herein in its entirety.

BRIEF DESCRIPTION OF THE DRAWINGS

The present application is further described in the detailed description which follows, in reference to the noted drawings by way of non-limiting examples of exemplary embodiment, in which like reference numerals represent similar parts throughout the several views of the drawings, and wherein.

DETAILED DESCRIPTION

Figure 1:
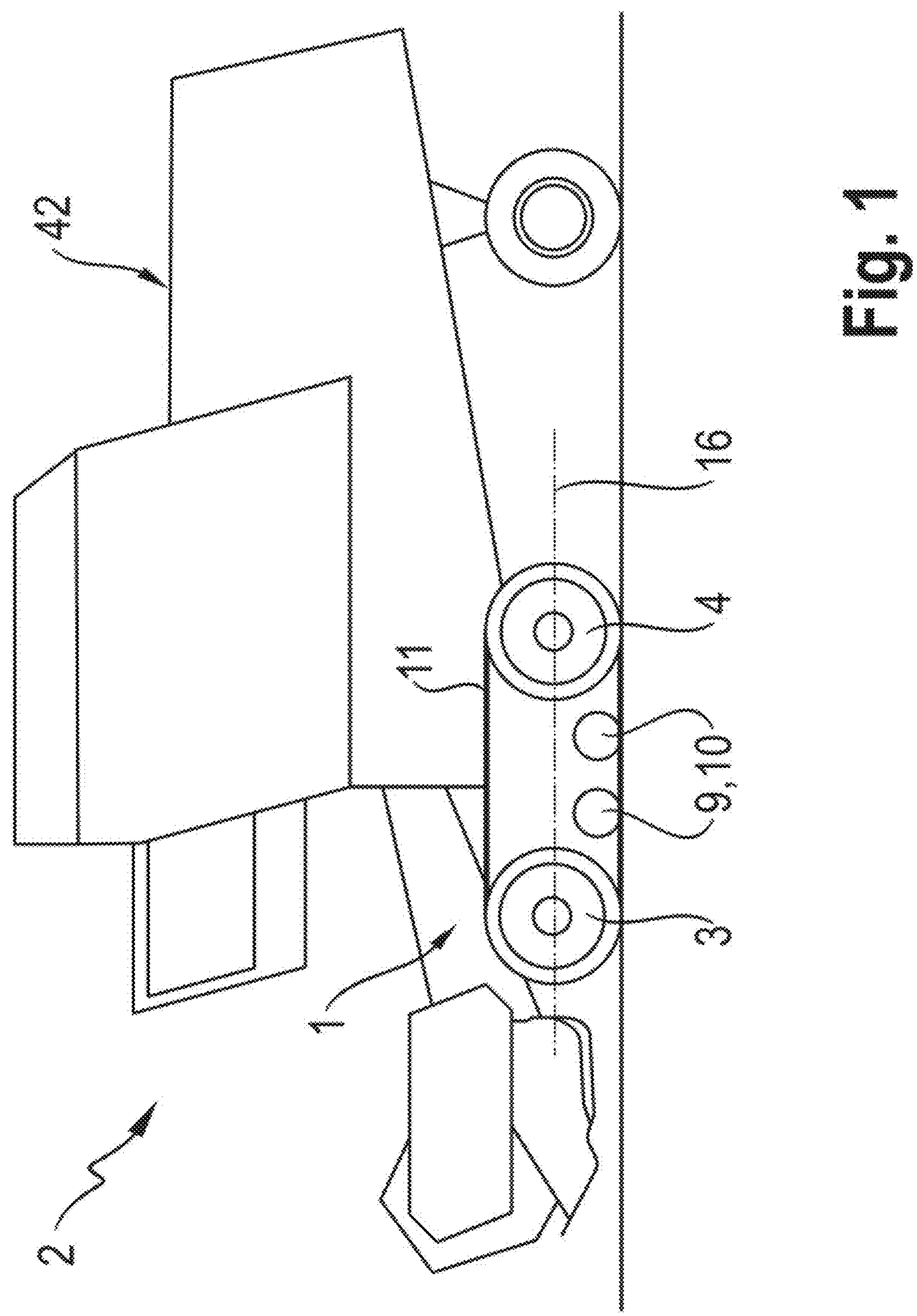
FIG. 1 illustrates a schematic side view of an agricultural work machine equipped with two crawler drives.

As discussed in the background, US Patent Application Publication No. 2015/0266524 A1 discloses a crawler drive. In order to cause a transfer of force which occurs via the crawler drive into a respective ground as evenly as possible via the individual wheels of the crawler drive (both main wheels and support wheels), a crawler drive typically comprises at least one piston-cylinder unit, which is connected at a first end to the support wheel swing arm and at a second end to the front main frame. The crawler drive may also comprise at least one additional piston-cylinder unit that connects the front main frame and the rear main frame to one another. The task of such piston-cylinder units is basically to equalize the force distribution over the individual wheels, even when obstacles are driven over (e.g., the crawler drive is not completely resting on at least essentially flat ground). The task is to transfer forces deflected via the crawler drive as evenly as possible via the wheels into the ground.

Typical crawler drives are quite involved to construct since the available installation space for the arrangement of various piston-cylinder units may be limited. In addition, the coordination between the individual piston-cylinder units is involved in order to achieve the most uniform possible force transfer via the wheels of the crawler drive in different operating situations of the respective crawler drive (e.g., in particular for different boundary conditions relating to the ground).

Thus, in one or some embodiments, a crawler drive is provided for an agricultural work machine which is constructed simpler than the prior art. This may be accomplished with a crawler drive including: a front main wheel; a rear main wheel opposite the front main wheel viewed in the longitudinal direction of the crawler drive; a front main frame associated with the front main wheel; a rear main frame associated with the rear main wheel; at least two support wheels arranged or positioned in an intermediate region between the main wheels; a running belt spanning the main wheels; an articulation point by means of which the crawler drive may be pivotably connected to a body of the agricultural work machine while forming a machine axis; and a coupling member. The two main frames may be pivotably coupled to one another about a common pivot axis. Further, the support wheels may be arranged or positioned one behind the other on a common support frame relative to a longitudinal axis of the crawler drive. And, the support frame may be pivotably connected to the front main frame by means of a support wheel swing arm. Moreover, the coupling member may be coupled to the support wheel swing arm at a swing arm end of the coupling member and to the rear main frame at a frame end of the coupling member, and thereby couples the support wheel swing arm and the rear main frame to one another.

Thus, in one or some embodiments, the crawler drive may include a coupling member which is coupled at its first end ("swing arm end") to the support wheel swing arm and at its second end ("frame end") to the rear main frame. As a result, the rear main frame and the support wheel swing arm may be coupled to each other in a force-transmitting manner via the coupling member. In a particular manner, the crawler drive may be free of further connections between the support wheel swing arm and the front and/or rear main frame, apart from the aforementioned coupling member and the articulated linkage to the front main frame.

In one or some embodiments, the crawler drive may have advantages. In particular, a force distribution between the main wheels and the support wheels may be created solely using the one coupling member between the support wheel swing arm and the rear main frame. This may be exemplified by the following case distinctions: first, the case is considered in which the front main wheel drives over an obstacle and is thereby raised relative to the support wheels and the rear main wheel. The lifting of the front main wheel may be accompanied by the lifting of the front main frame, on which the support wheel swing arm is mounted. According to the above explanation, the coupling member may be articulated to the support wheel swing arm by its swing arm end. Accordingly, the coupling member may also be raised a little. The amounts of lifting of the front main wheel and the coupling member may be in proportion to their respective distances relative to the pivot axis about which the front main frame is pivoted during the lifting of the front main wheel. Since the coupling member is coupled to the rear main frame at its frame end opposite the swing arm end, the rear main frame may also be lifted a little corresponding to the lifting of the coupling member. Since both the support wheel swing arm is articulated to the support frame and the rear main frame is articulated to the rear main wheel, the rear main wheel and the support wheels may remain at their previous height level and may therefore not be lifted off the ground. The coupling member may therefore ensure that the support wheels will continue to be used to transfer forces and therefore contribute to the force transfer of the respective agricultural work machine into the ground.

In the second case considered here, the support wheels drive over an obstacle and are accordingly lifted. This may also be accompanied by a lifting of the support wheel swing arm to which the coupling member is articulated. Since the support wheel swing arm is otherwise connected to the front main frame by forming a joint, the front main frame may only be moved indirectly, namely by lifting the rear main frame via the coupling member and an associated lifting of the connection point at which the front main frame is connected to the rear main frame while forming the joint axis. Since the front main wheel is assigned to the front main frame while forming its axis of rotation, the pivoting of the front main frame is not accompanied by a lifting of the front main wheel. As a result, the latter may remain in contact with the ground via the running belt and may thereby divert forces acting on the crawler drive into the ground. The same analogously may apply to the rear main wheel.

The above-described principle may apply analogously when the rear main wheel is lifted as a result of driving over an obstacle, whereby the forces are transferred to the support wheels via the coupling member.

Consequently, in one or some embodiments, the crawler drive may have the particular advantage that, in the simplest implementation with only a single coupling member, it may ensure that forces are continuously and reliably transferred to the ground via the two main wheels and the two support wheels. As a result, the crawler drive may be designed particularly simply, wherein in particular, a second coupling member, which in the prior art is typically designed as a piston-cylinder unit, may be dispensed with.

In one or some embodiments, the coupling member is oriented in such a way that a straight member axle (or articulated axle or member axis) of the coupling member, which connects the swing arm end and the frame end of the coupling member to one another, is inclined at most by 15°, such as at most by 10°, such as at most by 5°, relative to a vertical. This may have the advantage that the force distribution between the main wheels and the support wheels may be achieved particularly easily. In particular, no other compensating elements or the like need be required to ensure that a desired amount of force is transmitted to the support wheel swing arm and the support wheels if the coupling member were oriented "at an angle".

Furthermore, in one or some embodiments, the pivot axis of the two main frames and the machine axis coincide. In such an implementation, the crawler drive has a central main joint which forms the articulation point and to which it is connected to a respective axle of an agricultural work machine while forming the machine axis. The pivot axis, at which the front main frame and the rear main frame are pivotably connected to each other, is also formed at this central main joint. In one or some embodiments, the articulation point (and thus the machine axis and the pivot axis) may be located centrally on the crawler drive viewed in the longitudinal direction of the crawler drive, so that a horizontally measured distance of the axis of rotation of the front main wheel from the pivot axis is at least basically just as large as a horizontally measured distance of the axis of rotation of the rear main wheel from the pivot axis. This may also contribute to a simplification of the crawler drive, since the kinematics of the possible relative movements of the individual elements to one another may be simplified compared to an embodiment in which the pivot axis and machine axis are arranged or positioned separately from one another.

In one or some embodiments, the swing arm end and the frame end of the coupling member are arranged or positioned on the same side of a vertically oriented central plane, which may contain the pivot axis viewed in the longitudinal direction of the crawler drive. This center plane, which may be oriented perpendicular to a running belt plane spanned by the running belt, conceptually separates the crawler drive into a front section and a rear section, wherein the front section comprises the front main frame and the front main wheel, and the rear section comprises the rear main frame and the rear main wheel. According to the above description, the pivot axis may be located in correspondence of its position with the machine axis and further may be in a center of the crawler drive viewed in the longitudinal direction.

The arrangement of the coupling member on one side of the center plane, such as on the side of the front section, may also contribute to particularly simple kinematics of the crawler drive. In particular, the force ratio in which the support wheel swing arm and therefore the support wheels are subjected to forces or used to direct forces into the ground may be set by the distance of the coupling member from the pivot axis. The support wheels cause a greater transfer of force the closer the swing arm end of the coupling member is to the support frame viewed along the support wheel swing arm. For example, the swing arm end may be arranged or positioned exactly in the middle of the support wheel swing arm so that forces that are introduced into the support wheel swing arm via the coupling member are distributed half to the articulation of the support wheel swing arm to the front main frame and half to the support frame. A displacement of the swing arm end along the support wheel swing arm may correspondingly result in a distribution of the forces to the front main frame and the support frame that differs from the halved distribution. In one or some embodiments, the swing arm end of the coupling member is located in a direction parallel to the longitudinal axis of the crawler drive viewed at a distance from the pivot axis of at most ¼, such as at most ⅙, such as at most ⅛, of a correspondingly measured wheel spacing between the axes of rotation of the main wheels.

Furthermore, such an implementation of the crawler drive may be advantageous in which the axes of rotation of the two main wheels and the pivot axis are at least basically or substantially (e.g., no greater than 10% of one another; no greater than 5% of one another; no greater than 4% of one another; no greater than 3% of one another; no greater than 2% of one another; no greater than 1% of one another) at a common height level, at least when the crawler drive is in a central position. The pivot axis may be in its zero position when the crawler drive is in its center position. In one or some embodiments, the center position of the crawler drive describes a state of the crawler drive in which it is standing on level ground (e.g., neither the main wheels nor the support wheels are driving over an obstacle). Such a central position of a crawler drive is illustrated in each of the figures of the disclosed embodiment. The arrangement of the pivot axis at the same height level as the pivot axes of the main wheels may lead to the fact that no torque is generated around the pivot axis as a result of belt tension in the running belt. Due to the at least basically identical vertically measured distance of an upper section of the running belt from the swivel axle compared to the vertically measured distance of a lower section of the running belt from the swivel axle, the forces prevailing in the running belt may cancel each other out due to their identical lever arm in relation to the swivel axle, so that no torque occurs. Such a torque only occurs when the swivel axle is displaced vertically from its zero position, which may happen as a result of one of the wheels of the crawler drive being raised.

If there is a deflection of the swivel axle from its zero position in a vertical direction, for example as occurs as a result of the lifting of at least one of the wheels of the crawler drive when driving over an obstacle, a torque caused by the running belt and its belt tension must typically be expected to be applied around the swivel axle since the distances of the upper section of the running belt and the lower section of the running belt from the swivel axle will generally be different as a result of the vertical displacement of the swivel axle. Accordingly, the lever arms between the lower section of the running belt and the swivel axle and the upper section of the running belt and the swivel axle may be different so that the torques generated as a result of the belt tension around the swivel axle do not cancel each other out. It holds true that the greater the deflection of the pivot axis in the vertical direction, the greater the effective torque acting on the pivot axis, which may cause a pivoting of the front main frame relative to the rear main frame about the pivot axis. The system may reinforce itself in the process.

Due to these circumstances, in one or some embodiments, the crawler drive comprises at least one spring element. This may be designed as passive, wherein a spring force caused by the spring element is solely due to a deflection of the spring. A first end of the spring element may be connected to the front main frame, and a second end of the spring element may be connected to the rear main frame. Thus, in one or some embodiments, the spring element is configured to apply mutual torque about the common pivot axis to one or both of the front main frame and the rear main frame at least when the pivot axis is located above a zero position which a respective front main wheel or a respective rear main wheel assumes when the crawler drive is in a center position in which the crawler drive stands on level ground. In this way, the spring element connects the two main frames together so that the spring element is stretched or compressed when the two main frames are pivoted relative to each other about the pivot axis. Correspondingly, a change results in the spring force exerted by the spring element, half of which is applied to the front main frame and half to the rear main frame at the ends of the spring element. The spring element may be arranged or positioned in such a way that an effective axle of the spring element along which the spring force acts is located at a distance from the pivot axis. In this way, a torque is exerted on the two main frames about the pivot axis as a result of the spring force. Since the spring force at the ends of the spring element in principle acts in opposite directions on the front main frame and the rear main frame, the front main frame and the rear main frame may be subjected to opposing torques about the common pivot axis.

In this case, the spring element may be configured in such a way that when the crawler drive is in the center position (and therefore when the pivot axis is in its zero position), it is either in a passive state in which the spring element develops neither tensile forces nor compressive forces, or in a preloaded state with tensile stress or compressive stress, depending on the arrangement. Since the pivot axis typically cannot move downwards from its zero position, generally the only case to be considered is that the pivot axis is moved vertically upwards from its zero position. Accordingly, with regard to the effect of the belt tension, only such a state may be considered in which the crawler drive "rises" upwards (e.g., the swivel axle is deflected further upwards as a result of its vertical upward movement due to the effect of a torque caused by the running belt). The spring element may now serve to counteract this movement in particular and to at least reduce or limit the so-called "rising" of the crawler drive. If the spring element is arranged or positioned in such a way that the two ends of the spring element move away from each other in the course of a described rising movement of the crawler drive, the spring element may be designed as a tension spring that is preloaded with a tensile stress. Conversely, the spring element may also be arranged or positioned in such a way that its two ends are located at points on the front main frame and the rear main frame that move towards each other as a result of the rising of the crawler drive. In this case, the spring element may be designed as a compression spring that is preloaded with a compressive stress. In any case, the spring element should act in such a way that it counteracts the pivoting of the front main frame relative to the rear main frame as a result of the crawler drive rising.

Alternatively or in addition to a described spring element, it is also contemplated that the crawler drive may have an active piston-cylinder unit, the first end of which is connected to the front main frame, and the second end of which is connected to the rear main frame. The piston-cylinder unit may be configured to actively apply an opposing torque to the main frames about the common pivot axis. In contrast to the passive spring element, the active application of forces is therefore possible here. For example, such a piston-cylinder unit may be a hydraulic cylinder. The design of the crawler drive with such a piston-cylinder unit may have the advantage that the two main frames may be deliberately pivoted relative to each other about the pivot axis, and therefore not just a counter-effect to a possible rising of the crawler drive may be achieved. For example, by operating the piston-cylinder unit, the two main frames may be deliberately swiveled towards each other around the pivot axis (or swivel axis) so that the force transfer via the two main wheels into the ground is reduced, and the force transfer via the support wheels may accordingly be increased. This type of operation may be advantageous in the area of a headland, for example, in order to protect the ground from the introduction of high shear forces. This type of operation is also contemplated when an agricultural work machine is driving on the road.

In one or some embodiments, the crawler drive has both a passive spring element and an active piston-cylinder unit. In this way, the various operating states are particularly easy to set. The spring element and the piston-cylinder unit may optionally be designed in the form of a common assembly, wherein the spring element is designed as part of the piston-cylinder unit and acts on the piston at its one end and on the cylinder of the piston-cylinder unit at its other end. According to the above explanation of the spring element, this may result in an effect on the front main frame on the one hand and the rear main frame on the other.

Furthermore, such an embodiment of the crawler drive may be advantageous in which the coupling member is formed by a piston-cylinder unit. As such, the coupling member may be provided and configured to dampen movements that the support wheels and the rear main frame make relative to each other. To achieve this, it may be particularly advantageous if a main pressure chamber on the cylinder side of the coupling member interacts with a gas store so that the coupling member may act as a gas spring. This may ensure good driving comfort for the respective work machine on which the crawler drive is arranged or positioned. In particular, sudden deflections caused by driving over obstacles and the resulting forces may be damped. In addition to improving driving comfort, this may also protect the components of the crawler drive and the respective agricultural work machine as a whole.

If the coupling member is formed by a piston-cylinder unit, it may also be particularly advantageous if it is designed to be dual-acting. In this case, pressure may be applied to a secondary pressure chamber on the piston side, whereby pressure may be set in a main pressure chamber on the cylinder side. In particular, this may be done in such a way that the pressure in the main pressure chamber is within a preset range. In other words, by applying pressure to the secondary pressure chamber on the piston side, a pressure level in the main pressure chamber on the cylinder side may be deliberately kept within a certain range or the preset range. This may have the advantage that the coupling member may be kept within an advantageous range of its characteristic curve (e.g., the damping properties of the coupling member may be utilized in a particularly advantageous manner).

Further, in one or some embodiments, an agricultural work machine having the crawler drive described. In particular, the agricultural work machine may comprise a body and two crawler drives, such as a left crawler drive and a right crawler drive. The crawler drives may each be connected to the body via at least one articulation point (e.g., a respective articulation point). In particular, the crawler drives may be connected to a front axle of the agricultural work machine. The agricultural work machine may be characterized in that at least one of the crawler drives, such as both crawler drives, is or are formed by a crawler drive according to the disclosure herein. The thereby-resulting advantages have already been presented above.

Referring to the figures, FIG. 1 illustrates an agricultural work machine 2 in the form of a self-propelled combine harvester, the body 42 of which interacts with two crawler drives 1. The crawler drives 1 are connected to a front axle of the agricultural work machine 2. The crawler drives I have a front main wheel 3, a rear main wheel 4 and two support wheels 9, 10. Furthermore, the crawler drive 1 comprises a running belt 11 that spans the two main wheels 3, 4. The main wheels 3, 4 are arranged or positioned opposite each other viewed along a longitudinal axis 16 of the crawler drive 1. The support wheels 9, 10 are arranged or positioned in an intermediate area between the main wheels 3, 4. Overall, there is a transfer of forces which are conducted from the agricultural work machine 2 to the crawler drive 1 both via the main wheels 3, 4 and via the support wheels 9, 10 into the ground.

Figure 2:
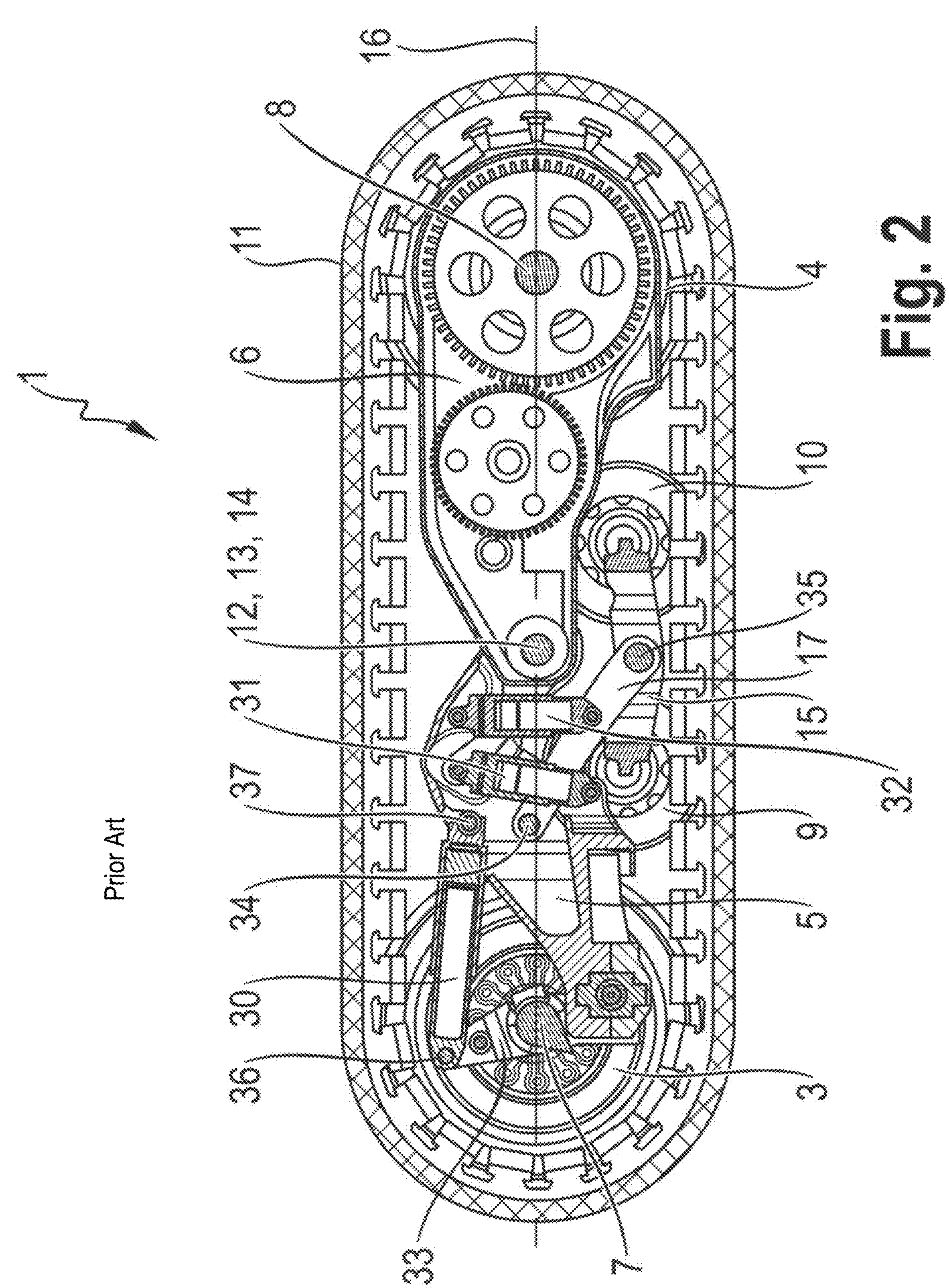
FIG. 2 illustrates a cross-section of a crawler drive according to the prior art.

In one or some embodiments, the construction of a crawler drive 1 is similar in certain respects to known crawler drives according to the prior art, such as the one depicted in FIG. 2. The crawler drive 1 therein has a front main frame 5 and a rear main frame 6. The two main frames 5, 6 are connected to each other at a central pivot point 12 of the crawler drive 1 while forming a pivot axis 14 so that they may pivot relative to each other. In the shown example, the pivot axis 14 coincides with a machine axis 13 formed at the pivot point 12 (or articulation point), about which the crawler drive 1 as a whole is pivotably mounted about a respective axis of the agricultural work machine 2. The machine axis 13 and the pivot axis 14 are oriented horizontally and perpendicular to a belt plane which is spanned by the running belt 11. In FIG. 2, the belt plane is formed by the drawing plane. Furthermore, the pivot axis 14 is arranged or positioned centrally in relation to the longitudinal axis 16 of the crawler drive 1 so that a vertical central plane 29, which is also oriented perpendicular to the belt plane of the running belt 11 and contains the pivot axis 14, divides the crawler drive 1 into two sections of at least substantially equal size, namely a front section and a rear section. The front section contains the front main frame 5 and the front main wheel 3, while the rear section comprises the rear frame 6 and the rear main wheel 4. Furthermore, when the crawler drive 1 is in a central position which is illustrated in FIG. 2, the pivot axis 14 is arranged or positioned centrally viewed in the vertical direction so that a vertically measured distance of the pivot axis 14 from a lower section 39 of the running belt 11 is just as large as a vertically measured distance of the pivot axis 14 from an upper section 38 of the running belt 11. As a result of this, forces prevailing in the running belt 11 as a result of belt tension in the running belt 11 do not cause any torque around the pivot axis 14, provided the latter is in its zero position shown in FIG. 2, which the pivot axis 14 assumes when the crawler drive 1 is in its center position.

A support wheel swing arm 17 is hinged to the front main frame 5 while forming a joint 34. At an end of the support wheel swing arm 17 opposite the joint 34, the latter is connected to a support frame 15, also while forming a joint 35. The two support wheels 9, 10 are each rotatably mounted on this support frame 15.

In the shown example, the front main wheel 3 is only indirectly mounted on the front main frame 5. This is done in such a way that the front main wheel 3 is mounted on a swivel arm 33, which in turn is articulated on the front main frame 5. In this way, a distance from the axis of rotation 7 of the front main wheel 3 to the pivot axis 14 may be changed by swiveling the swivel arm 33 relative to the front main frame 5. This is used to adjust the belt tension of the running belt 11. To achieve this, the shown crawler drive 1 comprises a belt tensioning cylinder 30 formed by a piston-cylinder unit, which is mounted with its first end 36 on the swivel arm 33 and with its second end 37 on the front main frame 5. By changing the deflection of the belt tensioning cylinder 30, the swivel arm 33 may be pivoted relative to the main frame 5, whereby the axis of rotation 7 is displaced horizontally in the manner described and the belt tension of the running belt 11 is accordingly changed.

The shown crawler drive 1 also comprises two further piston-cylinder units 31, 32, wherein the first of which couples the front main frame 5 to the rear main frame 6 and the second of which couples the support wheel swing arm 17 to the front main frame 5. In interaction, the piston-cylinder units 31, 32 are provided and configured to distribute the forces acting on the crawler drive 1 to the main wheels 3, 4 and the support wheels 9, 10. For this purpose, pressure chambers of the two piston-cylinder units 31, 32 may be fluidically coupled with each other so that the displacement of a hydraulic fluid from the pressure chamber of one piston-cylinder unit 31, 32 results in a corresponding inflow of the fluid into the pressure chamber of the other piston-cylinder unit 31, 32. In this way, the components of the front main frame 5, rear main frame 6 and support wheel swing arm 17 or support frame 15 are kinematically coupled to one another in order to achieve the aforementioned force distribution and, in particular, to keep the wheels 3, 4, 9, 10 in continuous contact with the ground. In particular, this should be maintained even if the wheels 3, 4, 9, 10 are raised differently when driving over an obstacle.

Figure 3:
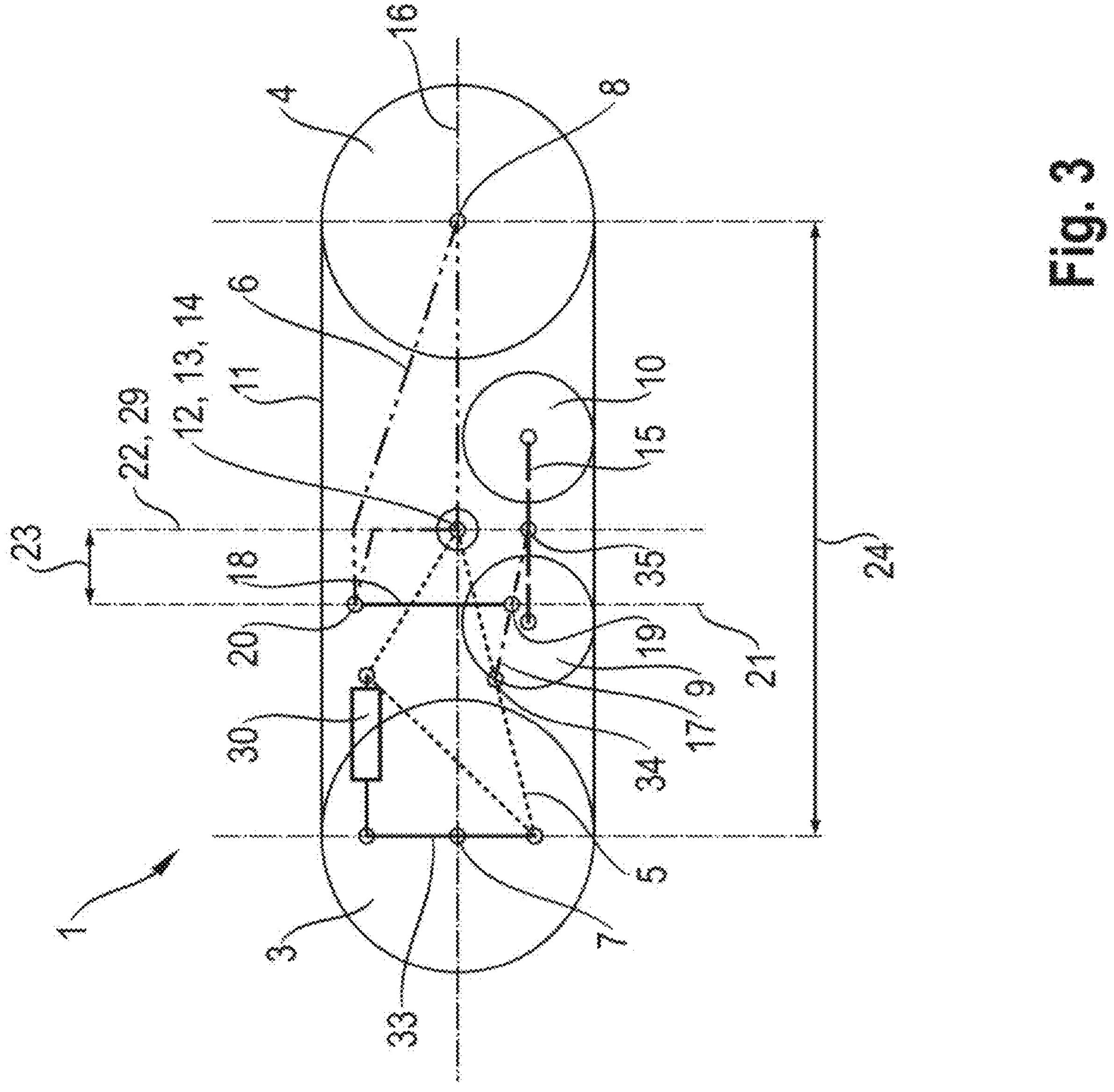
FIG. 3 illustrates a schematic diagram of a first crawler drive according to one or some embodiments.

A first variant of a crawler drive 1 according to one aspect of the invention is illustrated in FIG. 3. It differs from the known crawler drive 1 in particular by a coupling member 18 which couples the support wheel swing arm 17 to the rear main frame 6. Accordingly, one swing arm end 19 of the coupling member 18 is articulated to the support wheel swing arm 17, while one frame end 20 of the coupling member 18 is articulated to the rear main frame 6. In this way, the coupling member 18 acts mechanically as a pendulum rod, which may only transmit normal forces, but does not enable the transmission of torques between the support wheel swing arm 17 and the rear main frame 6. As a result of the coupling member 18, the front main frame 5, the support wheel swing arm 17 and the rear main frame 6 are kinematically coupled to each other. In this way, the coupling member 18 alone may ensure that when one of the wheels 3, 4, 9, 10 is lifted, the remaining wheels 3, 4, 9, 10 may remain in contact with the ground, and force accordingly may continue to be transferred to the ground via these wheels 3, 4, 9, 10. This has already been explained using two examples in the above description. In contrast to the crawler drive 1 as depicted in FIG. 2, it is therefore not necessary to install two separate piston-cylinder units 31, 32 in order to kinematically couple the support wheel swing arm 17 as well as the front main frame 5 and the rear main frame 6 to one another. Accordingly, the crawler drive 1 according to one aspect of the invention is significantly simplified compared to the prior art, without there being a restriction of its functionality. In a particularly advantageous manner, the crawler drive 1 according to FIG. 3 may be free of further coupling members which, for example, couple the support wheel swing arm 17 to the front main frame 5 or the two main frames 5, 6 to each other. Compared to the prior art, the crawler drive 1 is accordingly very simply designed without being disadvantageous in terms of its functionality.

In the shown example, the coupling member 18 is oriented at least substantially vertically, so that it is oriented at least substantially parallel to a vertical line 22. This may be seen particularly well from FIG. 3. Furthermore, the coupling member 18 is located completely on one side of the pivot axis 14, wherein in the shown example, it is located in the front section of the crawler drive 1 on this side of the center plane 29. Furthermore, the coupling member 18 is arranged or positioned in such a way that it is located at a horizontally measured distance 23 from the pivot axis 14 (with FIG. 3 further illustrating member axle 21 (or link axle)), which corresponds to approximately one eighth of a wheel distance 24, also measured horizontally, between the axes of rotation 7, 8 of the two main wheels 3, 4. In this arrangement, at least when the crawler drive 1 is in its center position shown in FIG. 3, one quarter of any force transmitted to the crawler drive 1 at the pivot point 12 is transmitted to the ground via each of the two main wheels 3, 4 and the two support wheels 9, 10. Furthermore, in the shown example, the swing arm end 19 of the coupling member 18 is arranged or positioned approximately centrally on the support wheel swing arm 17 so that a horizontally measured distance of the swing arm end 19 from the two joints 34, 35 is the same. This may cause approximately half of the vertical force transmitted via the coupling member 18 to the support wheel swing arm 17 to be transferred to the front main frame 5 and half to the support frame 15.

Figure 4:
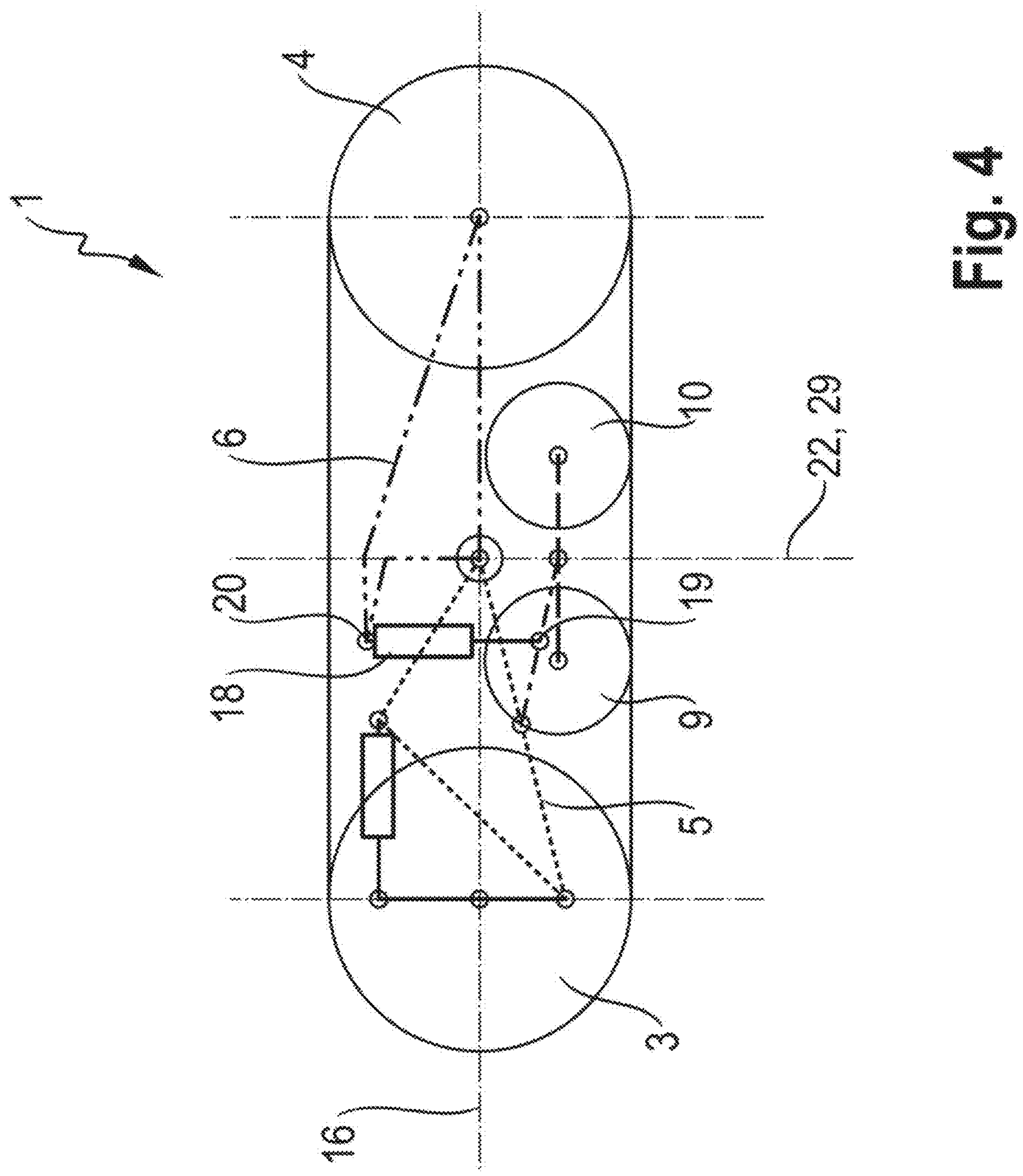
FIG. 4 illustrates a schematic diagram of a second crawler drive according to one or some embodiments.

In a further variant of a crawler drive 1 according to one aspect of the invention which is shown in FIG. 4, the coupling member 18 is formed by a piston-cylinder unit. Otherwise, the embodiments depicted in FIGS. 3-4 are similar. The embodiment of the coupling member 18 as a piston-cylinder unit may have the advantage that the coupling member 18 is equipped with a damping effect, whereby abruptly acting forces on the main wheels 3, 4 and/or the support wheels 9, 10 are only transmitted damped to the axle of the respective agricultural work machine 2. In this embodiment, the coupling member 18 may be designed in particular in the manner of a gas spring, wherein a cylinder-side main pressure chamber of the coupling member 18 may be filled with a gas that may be compressed as a result of the application of force. Furthermore, the main pressure chamber may interact for this purpose with a gas store (not shown).

Figure 5:
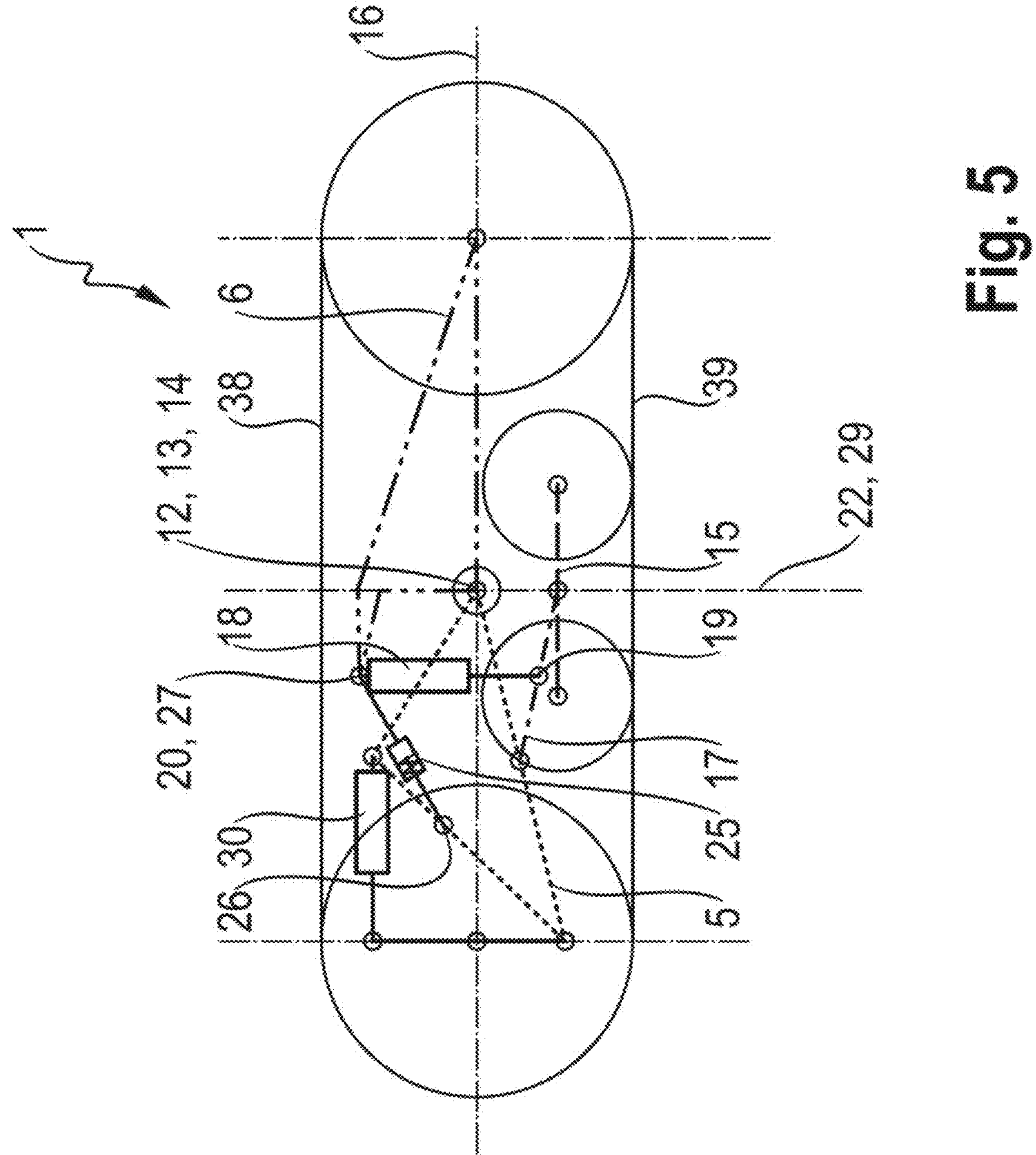
FIG. 5 illustrates a schematic diagram of a third crawler drive according to one or some embodiments.

A further variant of a crawler drive 1 according to one aspect of the invention which is shown in FIG. 5 is further developed compared to the second variant shown in FIG. 4 in that the crawler drive 1 also has a spring element 25. This is connected at a first end 26 to the front main frame 5 and at a second end 27 to the rear main frame 6 so that spring forces caused by the spring element 25 act directly on the front main frame 5 and the rear main frame 6 in opposite directions. In the shown example, the spring element 25 is designed passive so that forces caused by the spring element 25 are solely due to a deflection of the spring element 25. The spring element 25 may be designed in the form of a piston-cylinder unit, wherein a piston of the piston-cylinder unit guided in a cylinder is tensioned against the cylinder by means of a spring. In the shown example, the piston is connected to the front main frame 5 at the first end of the spring element 25, and the cylinder is connected to the rear main frame 6 at the second end 27 of the spring element 25.

The function of the spring element 25 may be to reduce and thereby control the above-described rising of the crawler drive 1 as a result of a vertical upward displacement of the pivot axis 14 starting from its zero position shown in FIG. 5. Said rising may be caused by the fact that a vertically measured distance of the pivot axis 14 is reduced as a result of a displacement of the same from an upper section 38 of the running belt 11, while a similarly measured distance of the pivot axis 14 from a lower section 39 of the running belt 11 is increased. This may cause a torque around the pivot axis 14 on the front main frame 5 and the rear main frame 6 as a result of belt tension of the running belt 11, so that a self-reinforcing upward deflection of the pivot axis 14 results. The spring element 25 may serve to counteract an increase in a distance between the two ends 26, 27 of the spring element 25 caused by such a movement of the two main frames 5, 6. In the shown example, this may be done in such a way that the spring of the spring element 25 acting between the piston and the cylinder is compressed and thereby counteracts the extension of the piston from the cylinder. As a result, the two ends 26, 27 of the spring element 25 may be pulled towards each other, whereby a torque is applied to the two main frames 5, 6 which counteracts the rising the crawler drive 1.

Figure 6:
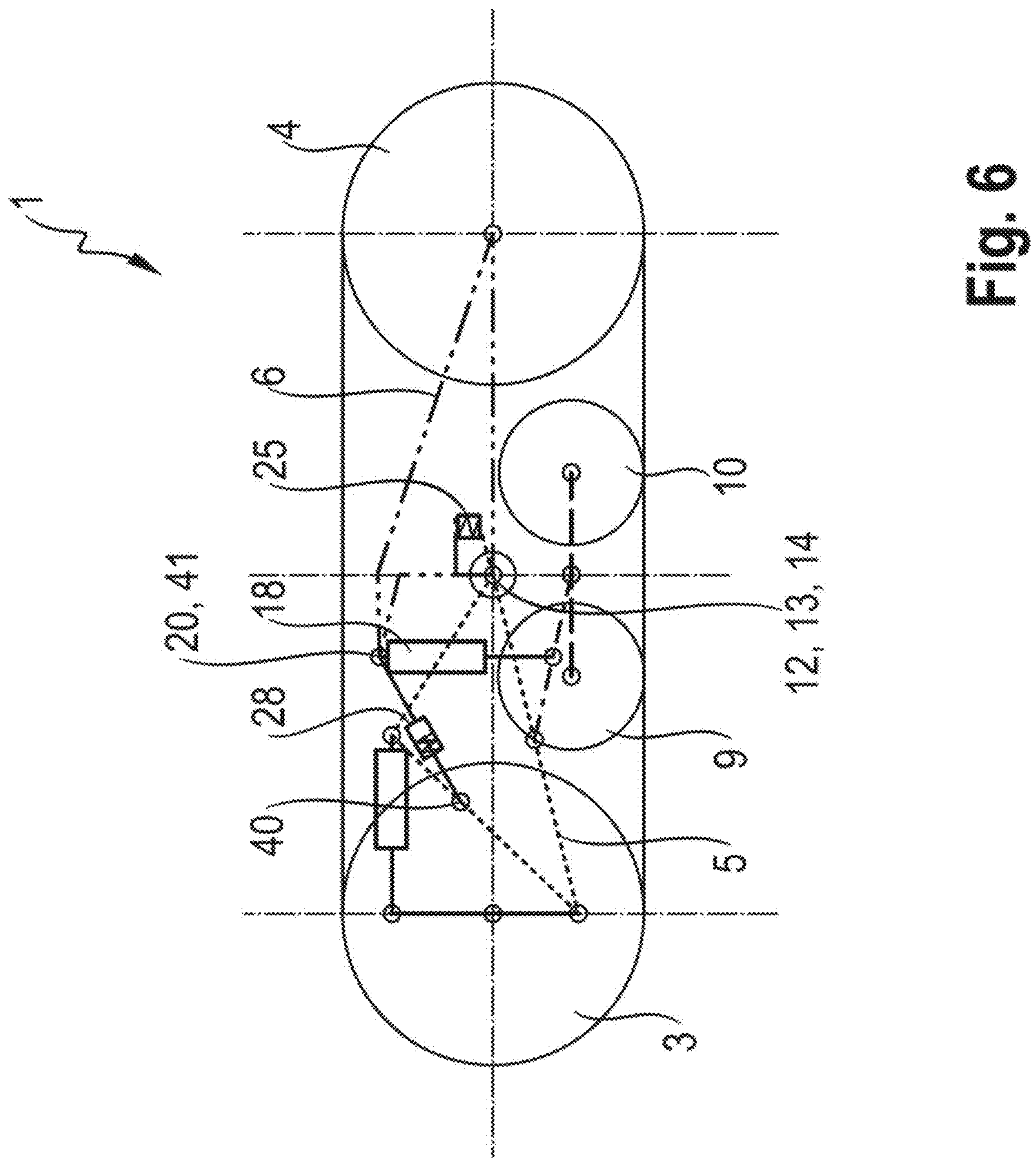
FIG. 6 illustrates a schematic diagram of a fourth crawler drive according to one or some embodiments.

In another variant of a crawler drive 1 according to one aspect of the invention which is shown in FIG. 6, the crawler drive 1 is also equipped with a passive spring element 25. However, in contrast to the third variant according to FIG. 5, this may be arranged or positioned at a different position, wherein the intended effect, namely the application of a torque that counteracts the rising of the crawler drive 1 when the pivot axis 14 is displaced, is identical. In this case, the spring element 25 is designed as a compression spring, which may be compressed when the crawler drive 1 rises and thus counteracts the rising. Furthermore, in the shown example, the crawler drive 1 may have an active piston-cylinder unit 28, the first end 40 of which interacts with the front main frame 5 and the second end 41 of which interacts with the rear main frame 6. The piston-cylinder unit 28 may be connected to a hydraulic pressure source, which is not shown in FIG. 6. This makes it possible, in particular, to pressurize a pressure chamber on the piston side of the piston-cylinder unit 28, whereby the piston is retracted into the cylinder. This may lead to a shortening of the piston-cylinder unit 28 and therefore to a movement of the two ends 40, 41 of the piston-cylinder unit 28 towards each other. At least when the crawler drive 1 is in a central position, such a movement means the same thing as the two main wheels 3, 4 being raised and thereby relieved, while the two support wheels 9, 10 contribute a greater share to the removal of the forces acting on the crawler drive 1. In this way, it may be possible to specifically reduce the forces transferred to the ground via the two main wheels 3, 4, which may be advantageous, for example, during a turning maneuver of the agricultural work machine 2 in the area of a headland or during road travel of the respective agricultural work machine 2.

It is moreover contemplated for the coupling member 18 designed as a piston-cylinder unit to be dual-acting. In this case, a main pressure chamber on the cylinder side of the coupling member may be fluidically connected to a gas store, for example, in order to fulfill a damper function, so that the coupling member 18 may act as a gas spring. Furthermore, a secondary pressure chamber on the piston side may be actively pressurized, for example by means of a coupling with a hydraulic pressure source of the respective agricultural work machine 2. This may allow the pressure in the main pressure chamber to be artificially maintained within a predetermined range. This may be advantageous, for example, if a force acting on the crawler drive 1 is so small that the pressure in the main pressure chamber is outside an advantageous range. In particular, an attempt is made to keep the coupling member 18 in an advantageous range of its characteristic curve in order to make the best possible use of the damping properties of the coupling member 18. By applying pressure to the secondary pressure chamber, the pressure in the main pressure chamber may be controlled in such a way that it is always within a predefined, advantageous range.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Crawler drive
2 Work machine
3 Front main wheel
4 Rear main wheel
5 Front main frame
6 Rear main frame
7 Axis of rotation
8 Axis of rotation
9 Support wheel
10 Support wheel
11 Running track
12 Articulation point
13 Machine axis
14 Pivot axis
15 Support frame
16 Longitudinal axis
17 Support wheel swing arm
18 Coupling member
19 Swing arm end
20 Frame end
21 Member axle
22 Vertical
23 Distance
24 Wheel distance
25 Spring element
26 End
27 End
28 Piston/cylinder unit
29 Center plane
30 Belt tensioning cylinder
31 Piston/cylinder unit
32 Piston/cylinder unit
33 Swing arm
34 Joint
35 Joint
36 End
37 End
38 Section
39 Section
40 End
41 End
42 Body

The invention claimed is:

1. A crawler drive for an agricultural work machine comprising:

a front main wheel;

a rear main wheel opposite the front main wheel viewed in a longitudinal direction of the crawler drive;

a front main frame associated with the front main wheel;

a rear main frame associated with the rear main wheel;

at least two support wheels positioned in an intermediate region between the front main wheel and the rear main wheel;

a running belt spanning the main wheels;

an articulation point by which the crawler drive is configured to be pivotably connected to a body of the agricultural work machine while forming a machine axis; and a coupling member;

wherein the front main frame and the rear main frame are pivotably coupled to one another about a common pivot axis;

wherein the support wheels are positioned one behind the other on a common support frame relative to a longitudinal axis of the crawler drive;

wherein the support frame is pivotably connected to the front main frame via a support wheel swing arm; and wherein the coupling member is coupled to the support wheel swing arm at a swing arm end of the coupling member and to the rear main frame at a frame end of the coupling member, and thereby couples the support wheel swing arm and the rear main frame to one another.

2. The crawler drive of claim 1, wherein the coupling member is aligned in such a way that a straight member axle connecting the swing arm end and the frame end is oriented inclined at most by 15° relative to a vertical line.

3. The crawler drive of claim 1, wherein the coupling member is aligned in such a way that a straight member axle connecting the swing arm end and the frame end is oriented inclined at most by 10° relative to a vertical line.

4. The crawler drive of claim 1, wherein the coupling member is aligned in such a way that a straight member axle connecting the swing arm end and the frame end is oriented inclined at most by 5° relative to a vertical line.

5. The crawler drive of claim 1, wherein the common pivot axis of the front main frame and the rear main frame coincides with the machine axis.

6. The crawler drive of claim 1, wherein the swing arm end and the frame end of the coupling member are positioned on a same side of a vertically oriented central plane containing the pivot axis.

7. The crawler drive of claim 1, wherein the swing arm end of the coupling member is positioned in a direction parallel to the longitudinal axis of the crawler drive viewed from the machine axis at a distance of at most ¼ of a correspondingly measured wheel distance between axes of rotation of the front main wheel and the rear main wheel.

8. The crawler drive of claim 1, wherein the swing arm end of the coupling member is positioned in a direction parallel to the longitudinal axis of the crawler drive viewed from the machine axis at a distance of at most ⅙ of a correspondingly measured wheel distance between axes of rotation of the front main wheel and the rear main wheel.

9. The crawler drive of claim 1, wherein the swing arm end of the coupling member is positioned in a direction parallel to the longitudinal axis of the crawler drive viewed from the machine axis at a distance of at most ⅛ of a correspondingly measured wheel distance between axes of rotation of the front main wheel and the rear main wheel.

10. The crawler drive of claim 1, wherein axes of rotation of the front main wheel and the rear main wheel and the pivot axis lie at least substantially on a common height level when the crawler drive is in a central position in which the crawler drive is standing on level ground.

11. The crawler drive of claim 1, further comprising a spring element whose first end is connected to the front main frame and whose second end is connected to the rear main frame; and wherein the spring element is configured to apply mutual torque about the common pivot axis to one or both of the front main frame and the rear main frame at least when the pivot axis is located above a zero position which a respective front main wheel or a respective rear main wheel assumes when the crawler drive is in a center position in which the crawler drive stands on level ground.

12. The crawler drive of claim 11, wherein the spring element comprises a passive spring element.

13. The crawler drive of claim 1, further comprising an active piston-cylinder unit a first end of which is connected to the front main frame, and a second end of which is connected to the rear main frame; and wherein the active piston-cylinder unit is configured to actively apply a mutual torque about the common pivot axis to the front main frame and the rear main frame.

14. The crawler drive of claim 1, wherein the coupling member is formed by a piston-cylinder unit; and wherein the piston-cylinder unit is configured to dampen movements which the support wheels and the rear main frame perform relative to one another.

15. The crawler drive of claim 14, wherein the piston-cylinder unit is designed as dual-acting; and wherein pressure is applied to a piston-side secondary pressure chamber; and wherein the pressure in a cylinder-side main pressure chamber is configured to be adjusted so that the pressure in the main pressure chamber is within a preset range.

16. An agricultural work machine comprising:

a body;

a left crawler drive;

a right crawler drive;

wherein the left crawler drive and the right crawler drive are each connected to the body via at least one articulation point; and wherein at least one of the left crawler drive or the right crawler drive comprises:

a front main wheel;

a rear main wheel opposite the front main wheel viewed in a longitudinal direction of the crawler drive;

a front main frame associated with the front main wheel;

a rear main frame associated with the rear main wheel;

at least two support wheels positioned in an intermediate region between the front main wheel and the rear main wheel;

a running belt spanning the main wheels;

an articulation point by which the crawler drive is configured to be pivotably connected to a body of the agricultural work machine while forming a machine axis; and a coupling member;

wherein the front main frame and the rear main frame are pivotably coupled to one another about a common pivot axis;

wherein the support wheels are positioned one behind the other on a common support frame relative to a longitudinal axis of the crawler drive;

wherein the support frame is pivotably connected to the front main frame via a support wheel swing arm; and wherein the coupling member is coupled to the support wheel swing arm at a swing arm end of the coupling member and to the rear main frame at a frame end of the coupling member, and thereby couples the support wheel swing arm and the rear main frame to one another.

17. The agricultural work machine of claim 16, wherein the coupling member is aligned in such a way that a straight member axle connecting the swing arm end and the frame end is oriented inclined at most by 15° relative to a vertical line.

18. The agricultural work machine of claim 16, wherein the common pivot axis of the front main frame and the rear main frame coincides with the machine axis.

19. The agricultural work machine of claim 16, wherein the swing arm end and the frame end of the coupling member are positioned on a same side of a vertically oriented central plane containing the pivot axis.

20. The agricultural work machine of claim 16, wherein the swing arm end of the coupling member is positioned in a direction parallel to the longitudinal axis of the crawler drive viewed from the machine axis at a distance of at most ¼ of a correspondingly measured wheel distance between axes of rotation of the front main wheel and the rear main wheel.

* * * * *